J. W. LEFFERTS.
Submerged-Filter.
No. 167,546. Patented Sept. 7, 1875.
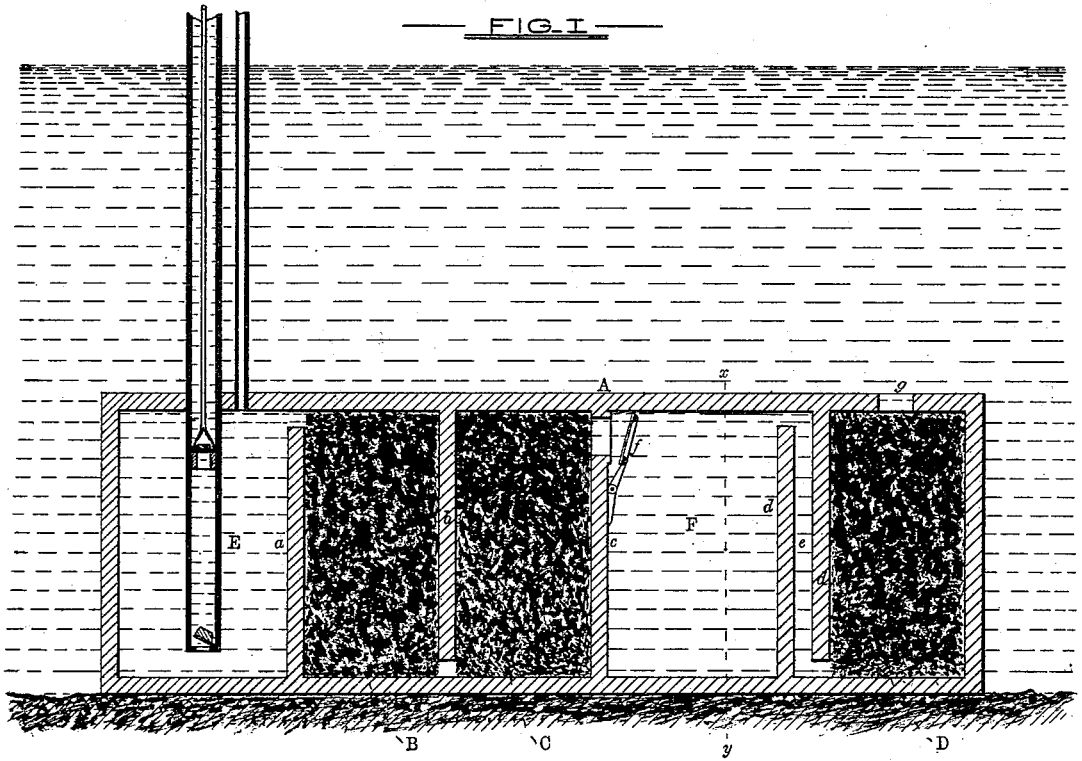
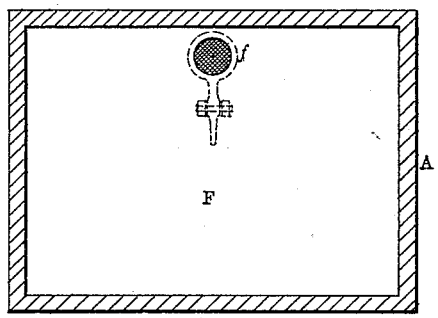
WITNESSES
W. W. Wharton
J. B. Greene
INVENTOR
John W. Lefferts
by G. H. & W. S. Howard
his Attys.

UNITED STATES PATENT OFFICE.

JOHN W. LEFFERTS, OF BALTIMORE, MARYLAND.

IMPROVEMENT IN SUBMERGED FILTERS.

Specification forming part of Letters Patent No. 167,546, dated September 7, 1875; application filed August 18, 1875.

*To all whom it may concern:*

Be it known that I, JOHN W. LEFFERTS, of the city of Baltimore and State of Maryland, have invented certain new and useful Improvements in Submerged Filters, of which the following is a specification; and I do hereby declare that in the same is contained a full, clear, and exact description of my said invention, reference being had to the accompanying drawing, and to the letters of reference marked thereon.

My invention relates to a submerged filter, having therein, in addition to the filtering appliances usually employed, a settling-chamber, or one in which the water, after being primarily cleansed of the coarser particles of foreign matter, is retained in a partial state of rest before passing to the compartments where the final filtering process takes place, as hereinafter fully described.

In the further description of my invention which follows due reference must be had to the accompanying drawing forming a part of this specification, and in which—

Figure 1 is a longitudinal section of my improved filter, and Fig. 2 a cross-section of the same upon the line $x\ y$.

Similar letters of reference indicate similar parts of the invention in both figures.

A is the casing of the filter, and $a$, $b$, $c$, and $d$ partitions therein, dividing the filter into the filtering-compartments B, C, and D, and pump and settling-chambers, represented, respectively, by E and F. The compartment D is filled with some coarse filtering mixture, and the ones B and C with a mixture somewhat finer and more compact. The partition $d$ is hollow, or provided with a channel, $e$, which allows the water to be conducted to the settling-chamber F, at the upper side thereof, to prevent the incoming current of water from disturbing the deposit in the said chamber. The water, in passing from the settling-chamber to the filtering-chamber C, passes through a strainer-valve, $f$, which prevents any matter floating in the water from clogging the parts of the filtering mixture adjacent to the valve-opening. The valve is hinged to admit of its having a vibratory movement, the valve remaining open when the pump, which is connected to the pump-chamber, is not in operation.

The vibratory movement of the valve prevents the interstices therein from becoming closed by fine particles of matter moving with the water continually in one direction.

Water is admitted to the chamber D through the aperture $g$.

Having thus described my invention, what I claim as new, and desire to secure by Letters Patent of the United States, is—

In a submerged filter, as described, the settling-chamber F, in combination with the strainer-valve $f$ and channel $e$, substantially as and for the purpose set forth.

In testimony whereof I have hereunto subscribed my name this 13th day of August, in the year of our Lord 1875.

JOHN W. LEFFERTS.

Witnesses:
WM. T. HOWARD,
JNO. T. MADDOX.